United States Patent
Issa et al.

(10) Patent No.: US 6,823,247 B1
(45) Date of Patent: Nov. 23, 2004

(54) REPROGRAMMING VEHICLE COMPUTERS VIA CD PLAYER

(75) Inventors: Nabil M Issa, Novi, MI (US); Sujal B Shah, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 18 days.

(21) Appl. No.: 10/464,044

(22) Filed: Jun. 18, 2003

(51) Int. Cl.[7] .............................................. G06F 7/00
(52) U.S. Cl. ............................. 701/36; 701/33; 701/35
(58) Field of Search .............................. 701/29, 36, 48, 701/33, 35, 49; 370/203, 252; 73/432.1, 116, 117.2, 117.3; 702/183, 185

(56) References Cited

U.S. PATENT DOCUMENTS 6,629,029 B1 * 9/2003 Giles ........................... 701/35
6,678,606 B2 * 1/2004 Akins et al. ................. 701/114

OTHER PUBLICATIONS

PubNo. US 2002/0193910 A1 Strege et al. Disclose a method and apparatus for wireless information transfer in vehicle service systems.*

* cited by examiner

Primary Examiner—Gertrude A. Jeanglaude
(74) Attorney, Agent, or Firm—Ralph E. Smith

(57) ABSTRACT

A method and system for flashing motor vehicle electronic control modules incorporates a networked system to transfer data from an entertainment system associated with the vehicle to electronic control modules. The data is stored on a data storage medium accessed by the entertainment system component and transferred to the database network which then transports the data to the electronic control modules.

12 Claims, 2 Drawing Sheets

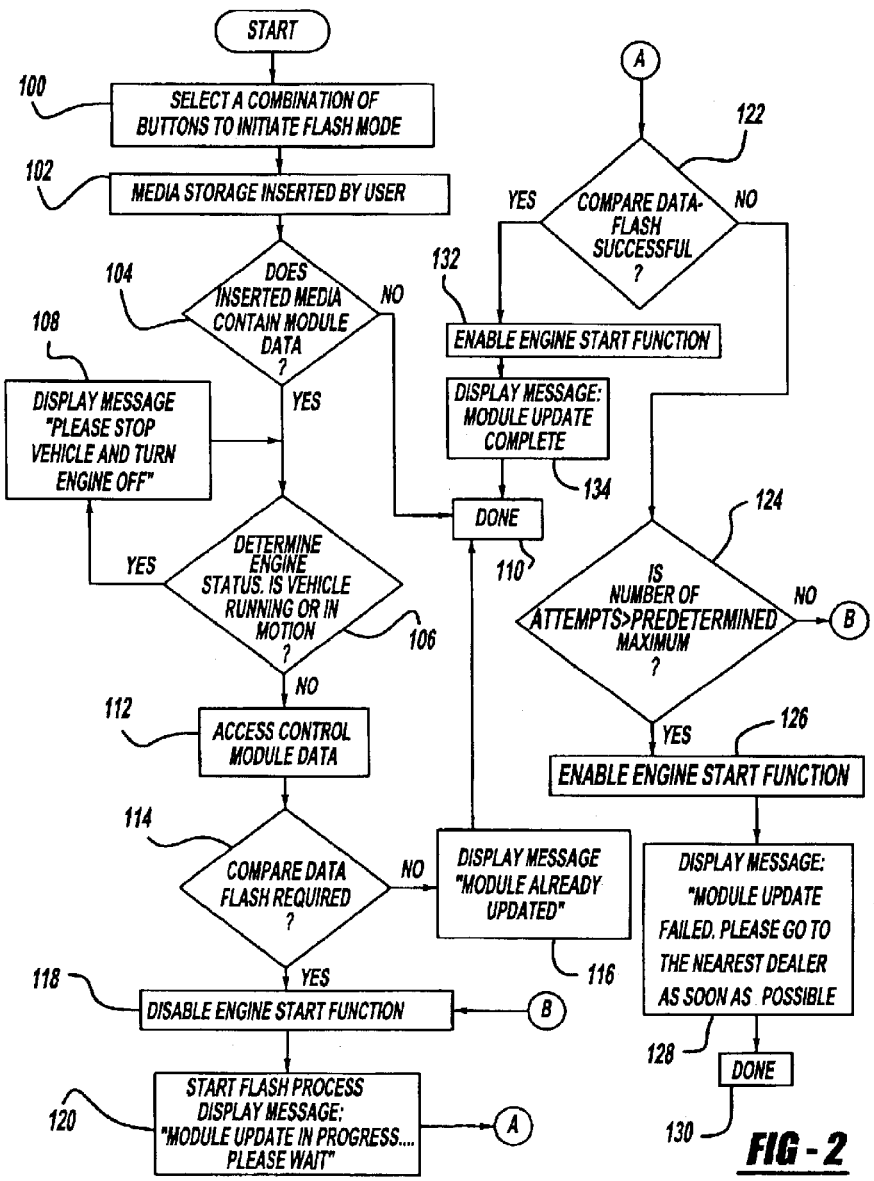

REPROGRAMMING VEHICLE COMPUTERS VIA CD PLAYER

FIELD OF THE INVENTION

The present invention relates to the arrangements for updating electronic control modules on a motor vehicle.

BACKGROUND OF THE INVENTION

Electronic control modules (ECM's) are semiconductor units used to control various vehicle systems, such as the transmission, body and engine. Traditionally, electronic control modules were unmodifiable single units with inseparable hardware and software.

Today, vehicles are equipped with reprogrammable ECM's that include Flash software allowing the ECM's to be modified/reprogrammed repeatedly. Flashing is currently performed by manufacturer authorized automobile dealerships. When an upgrade or change to an ECM is required, the automobile manufacturer contacts the vehicle owner by mail with instructions to make an appointment with a local authorized dealership to have the ECM reprogrammed. The process of contacting the consumer and performing the upgrade is time consuming and labor intensive. In addition, the automobile manufacturer assumes all costs associated with the mailings, and must reimburse the dealership for expenses relating to the ECM upgrade.

SUMMARY OF THE INVENTION

Therefore, in accordance with one aspect of the present invention, apparatus is provided for flashing a memory of at least one electronic control module of a vehicle. A portable data storage medium compatible with a vehicle entertainment system, such as an audio and/or video system component, contains control module data. The entertainment system component is coupled via a data bus to the at least one control module and is operative to read control module data from the data storage medium and to transfer the control module data to the electronic control module via the data bus.

In another aspect of the invention, a method for flashing a memory of a motor vehicle electronic control module includes inserting a data storage medium into an entertainment system component associated with the vehicle, detecting presence of control module data on the data storage medium, accessing, with the entertainment system component, the control module data resident in the data storage medium and transferring the control module data to the memory of the electronic control module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a flow chart depicting a method for flashing a motor vehicle electronic control module.

DETAILED DESCRIPTION

Figure 1:
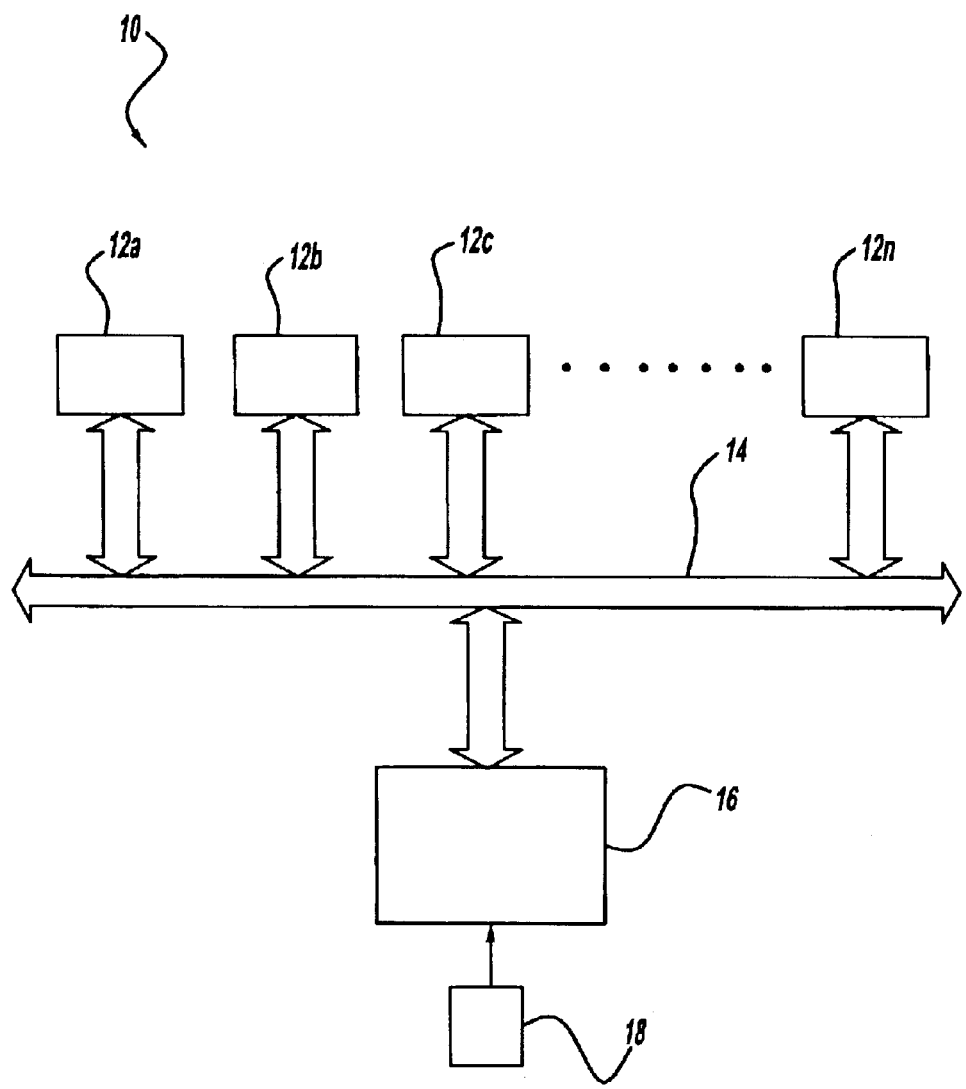
FIG. 1 is a block diagram showing the components of a motor vehicle electronic control module flashing system.

The following description is merely exemplary in nature and is in no way intended to limit the invention, its application, or uses.

FIG. 1 illustrates a module flashing system 10 generally including electronic control modules (ECM's) 12a, 12b, ... 12n, a data bus 14, an audio system component 16 and a data storage medium 18.

A plurality of ECM's 12a, 12b ... 12n, each dedicated to a particular vehicle function, are networked together via the data bus 14. ECM's 12a, 12b ... 12n are conventional electrical devices used across industry lines to control individually operated systems via programs stored in memory units of the modules. The examples set forth herein discuss ECM's as they apply to automobiles, however, the technology disclosed may also apply to other reprogrammable control modules. The ECM's 12a, 12b, ... 12n communicate with the system network via data bus 14, which controls the exchange of data between all network components. These ECM's could, for example, control a vehicle engine, or a vehicle transmission.

Among the network components is a vehicular entertainment/audio system component 16 that communicates with the electronic control modules 12a, 12b ... 12n via data bus 14. Component 16 is, for example, a radio with dot matrix, British Flag or PFT displays, and with DVD or CD-ROM capabilities. In addition, component 16 may include hardware devices capable of receiving other types of memory media, such as a memory stick.

The information used to flash the memory unit of an ECM 12a, 12b, ... 12n is transferred to the audio system component 16 by a data storage medium 18. The information on the data storage medium 18 generally contains applicable ECM 12a, 12b, ... 12n software upgrades, the latest ECM 12a, 12b, ... 12n part numbers, ECM 12a, 12b, ... 12n identification information, s-record files, a list of obsolete part numbers, and a list of vehicles for which the data on the storage medium 18 applies. Data storage media include, but are not limited, to DVD's, CD-ROM's, memory sticks or any other memory devices compatible with an audio system component of the vehicle.

According to FIG. 2, a method for updating vehicular electronic control modules (ECM's) is provided. At step 100, the user selects a combination of buttons located on the audio system component 16 to initiate the flashing mode. This causes the component 16 to abandon its normal operating function, which in most cases is either playing the radio or a CD or DVD. At step 102, a user inserts a data storage medium 18, for example a CD 18, into the audio system component 16, in this instance, a CD player. At step 104, the CD player 16 scans a table of contents of the CD 18 to determine whether the inserted CD 18 contains data to be flashed onto an ECM 12a, 12b, ... 12n. If the CD player 16 detects no flash data, the process terminates at step 110 and the CD player 16 returns to normal operation. If, however, flash data is detected on the CD 18, at step 106 the vehicle running conditions are detected. If at step 108 the vehicle is running, or in motion, a message will display on the CD player 16 stating something like "PLEASE STOP VEHICLE AND TURN OFF ENGINE". Conversely, at step 112, if the vehicle engine is not running and not in motion the CD player 16 will read the data from the CD 18 and determine which ECM 12a, 12b, ... 12n is to be upgraded.

The information accessed from the CD 18 will generally include the ECM 12a, 12b, ... 12n identification and part number along with other data relating to module specifications or new programming information. At step 114, the system 10 compares the CD data 18 with the data presently residing on the ECM 12a, 12b, . . . 12n to determine if there is a discrepancy in the data. At step 116, if the data on the CD 18 matches the data on the ECM 12a, 12b, . . . 12n, a message similar to "MODULE ALREADY UPDATED" will be displayed on the CD player. At step 110 the flashing process terminates and the CD player 16 returns to normal operation. If a discrepancy in the data at step 120 is detected, at step 118 the system 10 will disable the engine start function and display a message on the CD player 16 similar to "MODULE UPDATE IN PROGRESS . . . . PLEASE WAIT", indicating that the flashing process has begun.

At the conclusion of the flashing process the system 10 initiates another comparison at step 122 between the data on the CD 18 and the data on the ECM 12a, 12b, . . . 12n to determine whether the transfer of information via the flashing process was successful. If the flash was successful, at step 132 the engine start function is enabled and a message similar to "MODULE UPDATE COMPLETE" is displayed at step 134. The system 10 then terminates at step 110 and returns to normal operation. If there is still a discrepancy at step 122, and the flash was unsuccessful, at step 124 the system 10 will determine if a flash has been attempted more than a predetermined number of times. If the number of attempts at step 124 is greater than a predetermined number of attempts, at step 126 the engine start function is enabled and a message at step 128 is displayed on the CD player 16 similar to "MODULE UPDATE FAILED. PLEASE GO TO THE NEAREST DEALER." Once the message has displayed, the system terminates at step 130 and returns to normal operation. If however the number of attempts determined at step 124 is less than the predetermined maximum, the engine start function is again disabled at step 118 and the flash process is reinitiated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a vehicle having at least one electronic control module, an arrangement for flashing a memory of the at least one module comprising:

a portable data storage medium containing one of entertainment data and control module data, the data storage medium further containing an indicator of the presence of control module data; and an entertainment system component of the vehicle having a memory reader for removable receipt of the portable data storage medium, the entertainment system component coupled via a data bus to the at least one module, said entertainment system component operative to read control module data from said data storage medium and to transfer the control module data to the at least one electronic control module via the data bus upon detection of the indicator in the portable data storage medium.

2. The arrangement of claim 1, wherein the at least one electronic control module is a transmission controller module.

3. The arrangement of claim 1, wherein the at least one electronic control module is an engine controller module.

4. The arrangement of claim 1, wherein said data storage medium comprises a memory stick.

5. The arrangement of claim 1, wherein said data storage medium comprises a DVD and the entertainment system component comprises a DVD player.

6. The arrangement of claim 1, wherein said data storage medium comprises a CD-ROM and the entertainment system component comprises a CD player radio.

7. The arrangement of claim 1, wherein said control module data on said data storage medium includes at least one of:

electronic control module identification information, an s-record file, obsolete part numbers, and a list of vehicles to which the data applies.

8. A method for flashing a memory of a motor vehicle electronic control module using an entertainment system component installed in the vehicle, said method comprising:

inserting a data storage medium into said entertainment system component, detecting presence of control module data on said data storage medium;

accessing, with the entertainment system component, said control module data resident on said data storage medium; and flashing said electronic control module with the entertainment system component by transferring the control module data to said memory of said electronic control module.

9. The method of claim 8, further comprising actuating a combination of buttons on the entertainment system component to initiate a flashing mode.

10. The method of claim 8 further comprising determining if the electronic control module requires flashing by comparing existing data in the electronic control module with the control module data accessed from the data storage medium.

11. The method of claim 8 further comprising verifying a successful flash by comparing the control module data on the data storage medium with the data in the electronic control module.

12. The method of claim 8 further comprising:

initiating flashing only after determining that the vehicle is stopped and a vehicle engine is off.

* * * * *